United States Patent [19]

Nakajima

[11] 3,772,459

[45] Nov. 13, 1973

[54] WHITE BALANCE CONTROL SYSTEM

[75] Inventor: Kazuhiko Nakajima, Yokohama, Japan

[73] Assignee: Sony Corporation, Tokyo, Japan

[22] Filed: Mar. 27, 1972

[21] Appl. No.: 238,509

[30] Foreign Application Priority Data

Mar. 30, 1971 Japan .............................. 46/19039

[52] U.S. Cl. .......................................... 178/5.4 BT

[51] Int. Cl. .......................................... H04n 9/06

[58] Field of Search .................. 178/5.4 R, 5.4 ML, 178/5.4 AC

[56] References Cited

UNITED STATES PATENTS

| | | | |
|---|---|---|---|
| 3,463,875 | 8/1969 | Lovely | 178/5.4 R |
| 2,927,151 | 3/1960 | Loughren | 178/5.4 ML |
| 3,135,824 | 6/1964 | Boothroyd | 178/5.4 R |
| 3,209,071 | 9/1965 | Bradley | 178/5.4 AC |

*Primary Examiner*—Harvey E. Springborn
*Attorney*—Lewis H. Eslinger et al.

[57] ABSTRACT

A white balance control system comprised of a circuit for selectively controlling the phase of a signal having the same frequency as a color subcarrier signal of a chrominance signal, a modulator for amplitude modulating the phase controlled color signal with a luminance signal, and an adder for combining the amplitude modulated signal with the chrominance signal to control the white balance in response to the selected phase of the color signal.

4 Claims, 30 Drawing Figures

PATENTED NOV 13 1973 3,772,459
SHEET 01 OF 10
PRIOR ART FIG. 1
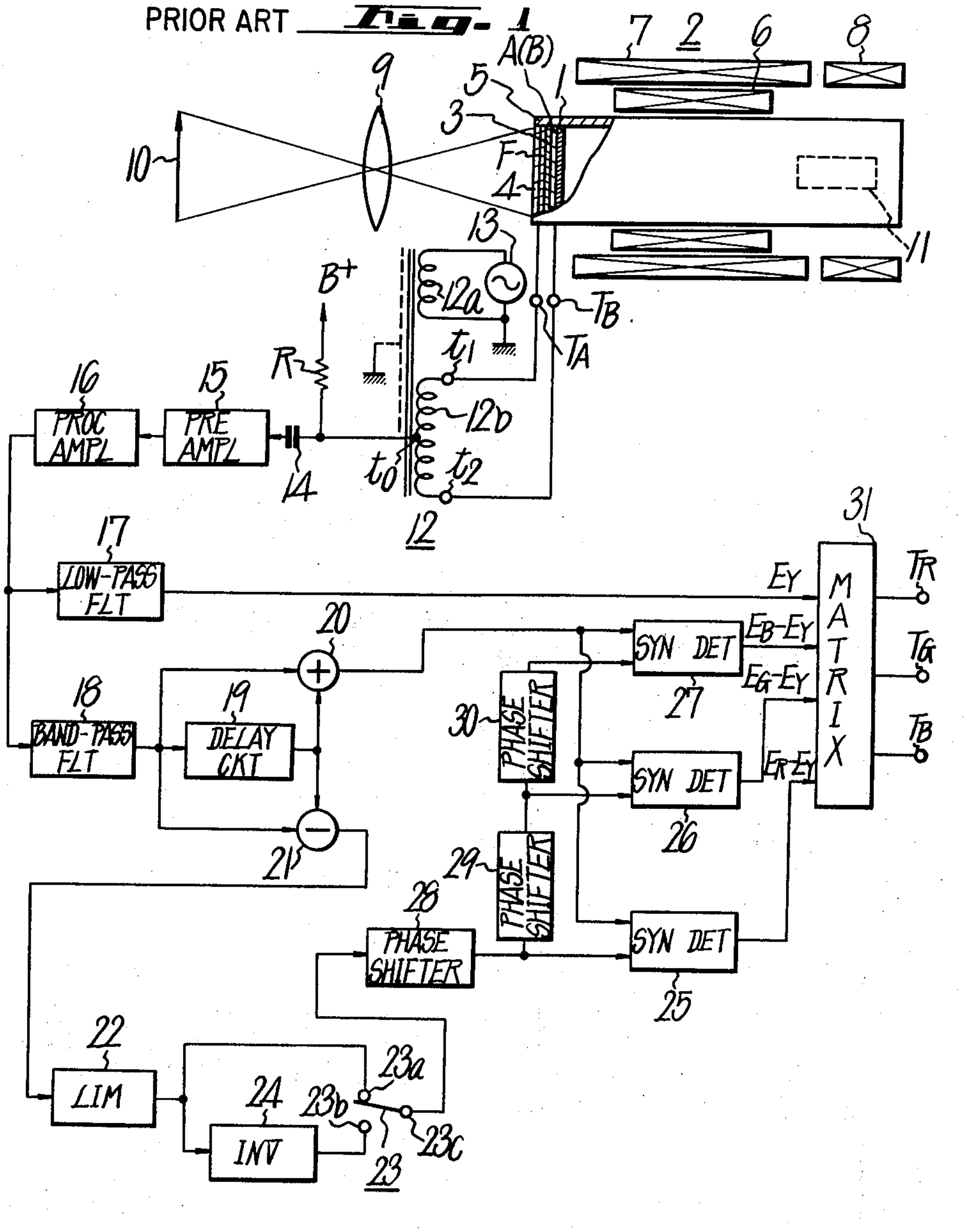

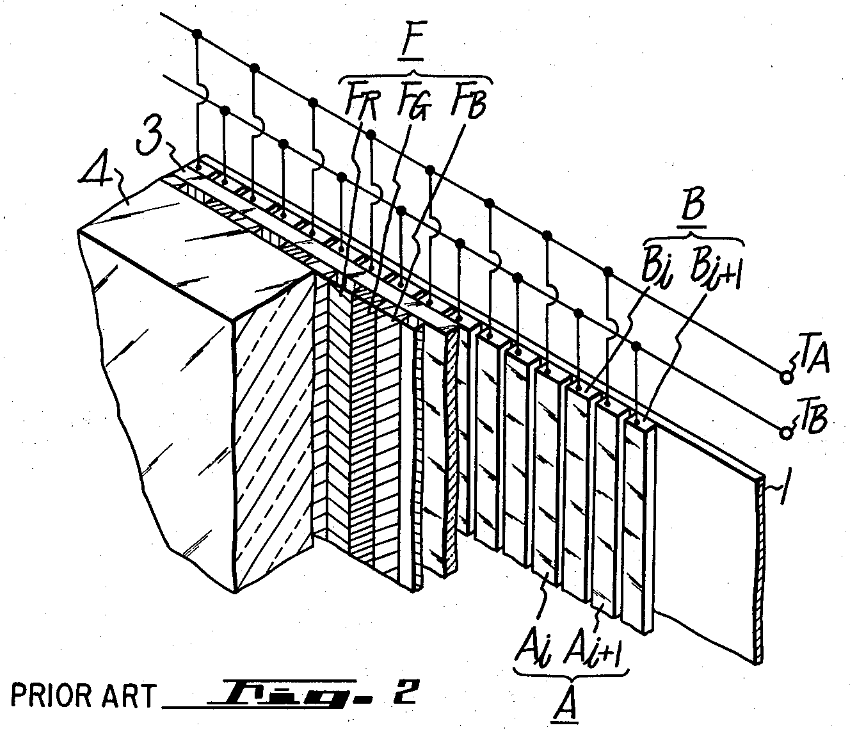
PRIOR ART Fig. 2
Fig. 3
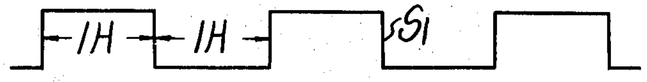
Fig. 5
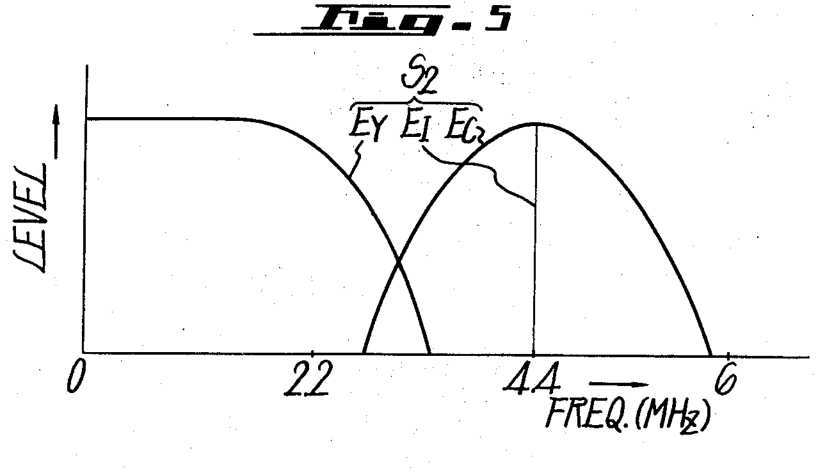

PRIOR ART FIG. 6
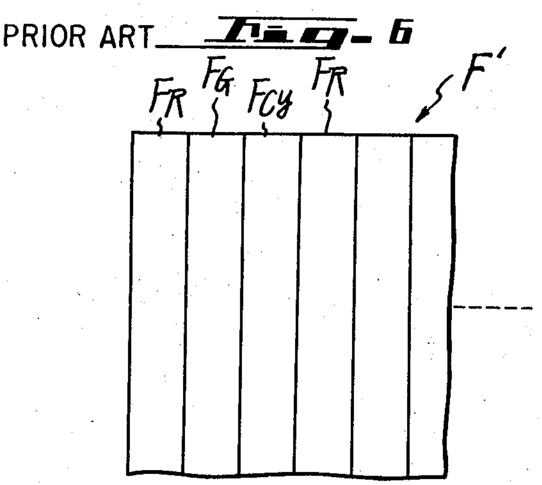
FIG. 7
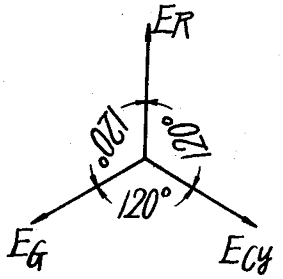
FIG. 8
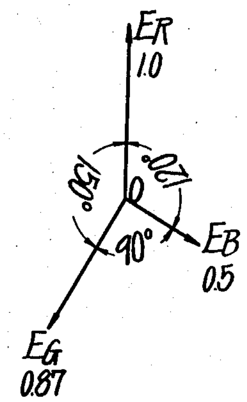

PATENTED NOV 13 1973 3,772,459

SHEET 08 OF 10

PATENTED NOV 13 1973 3,772,459

SHEET 09 OF 10

WHITE BALANCE CONTROL SYSTEM

BACKGROUND OF THE INVENTION

The invention relates to a white balance control system for a television camera and more particularly to a white balance control system capable of controlling the white balance without demodulating the chrominance signal from the camera.

Even if a normal color television camera is adjusted to obtain a good white balanced color video signal or chrominance signal in a television studio using a standard illumination, for example an illumination having a color temperature of 3,000°K, its white balance is lost when the camera is moved to the outdoors. As a result, an image reproduced from the signal looks pale.

To adjust the white balance of prior art television cameras, an optical filter for a particular color temperature correction is sometimes used. Different filters are exchanged in accordance with the color temperature of the illumination used. The handling and operation of such filters is troublesome and time consuming.

Some prior color television cameras employ a color separation filter for producing a composite video signal of a chrominance signal and a luminance signal directly from a single image pickup tube. In such cameras the lack of uniformity of the color separation characteristics of the color filter or the unequal width of each color filter stripe element causes loss of the white balance of the chrominance signal, so that the reproduced image looks pale.

It is the practice in still other prior art systems while televising a white object to control the gains of gain control circuits provided in all or in two of the amplifiers for the red, green and blue video signals in a manner to retain the signals at substantially the same level. However, control of each color exerts an influence upon the balance of the other two colors, so that accurate adjustment of the white balance is difficult and the operation therefore is troublesome.

In one prior electrical white balance control system, as described in, for instance, U.S. Pat. No. 3,627,911 granted Dec. 14, 1971, and having the same assignee as this application, it was impossible to control the white balance without demodulating the chrominance signal to a color difference signal or a primary color signal, and so to transmit the chrominance signal unchanged.

SUMMARY OF THE INVENTION

The above and other disadvantages are overcome by a preferred embodiment of the present invention of a white balance control system for use with a color television camera of the type producing a composite signal of a luminance signal and a chrominance signal comprising means responsive to the composite signal for separating out the chrominance and luminance signals, means for providing a first signal having the same frequency and phase as those of a subcarrier signal of the chrominance signal, means responsive to the first signal for selectively controlling its phase, means for amplitude modulating the phase controlled first signal in response to the luminance signal, and means for combining the amplitude modulated, phase controlled first signal with the chrominance signal to obtain a white balanced chrominance signal.

It is one object of the invention to provide a white balance control system for correcting the loss of white balance of the chrominance signal obtained from a color television camera due to a change of the color temperature of the illumination of the object or due to the use of an optical filter.

It is another object of the invention to provide a system for obtaining a white balanced NTSC signal from a color television camera having one image pickup tube without the necessity of demodulating the color signal components.

The above, and other objects, features and advantages of this invention, will be more readily understood upon consideration of the following detailed description of certain preferred embodiments of the invention, taken in connection with the accompanying drawings.

BRIEF DESCRIPTION OF THE DRAWINGS

FIG. 1 is a block diagram showing one example of a color television camera to which this invention may be advantageously applied;

FIG. 2 is an enlarged, fragmentary perspective view, partly in section, of a principal part of an image pickup tube included in the camera of FIG. 1;

FIGS. 3 and 4A–4F are waveform diagrams, to which reference will be made in explaining the operation of the camera of FIG. 1;

FIG. 5 is a graph showing the frequency distribution in the output from the camera of FIG. 1;

FIG. 6 is a fragmentary plan view of a color filter for use in the camera according to this invention;

FIGS. 7 and 8 are vector diagrams of a color signal produced when employing the filter shown in FIG. 6;

DESCRIPTION OF THE PREFERRED EMBODIMENT

Figure 4A:
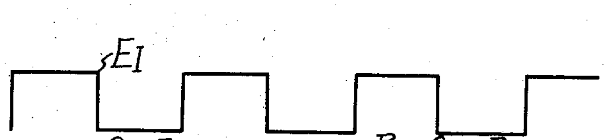

Referring to the drawings in detail, and initially to FIGS. 1 and 2 thereof, it will be seen that a color television camera to which this invention may be advantageously applied may be of the type disclosed in detail in U.S. Patent application Ser. No. 72,593, filed Sept. 16, 1970, and U.S. Pat. application Ser. No. 202,469, filed Nov. 26, 1971; both applications having a common assignee herewith. Such a camera comprises an electrode A consisting of parallel, spaced electrode stripes $A_1, A_2, --- A_i -- A_n$, and an electrode B consisting of parallel, spaced electrode stripes $B_1, B_2, -- B_i --- B_n$ disposed adjacent the photoconductive layer 1 of an image pickup tube 2. The photoconductive layer 1 may be formed, for example, of materials such as antimony trisulfide, lead oxide, and the like, and the electrodes A and B are transparent conductive layers formed, for example, of tin oxide including antimony. The conductive stripes of electrodes A and B are alternately arranged, for example, in the order $A_1$, $B_1$, $A_2$, $B_2$ - - - $A_i$, $B_i$, - - - $A_n$, $B_n$, and the electrodes A and B are respectively connected to terminals $T_A$ and $T_B$ for connection with external circuits. Further, the electrodes A and B are disposed so that the longitudinal directions of the stripes may cross the horizontal scanning direction of an electron beam in tube 2.

The electrodes A and B are disposed on one side of a glass plate 3, on the other side of which there is disposed an optical filter F made up of red, green and blue color filter elements $F_R$, $F_G$ and $F_B$ which are stripe-like and arranged in a repeating cyclic order of $F_R$, $F_G$, $F_B$, $F_R$, $F_G$, $F_B$, . . . Such filter elements are disposed parallel to the length of the conductive stripes of electrodes A and B in such a manner that each triad of red, green and blue color filter elements $F_R$, $F_G$ and $F_B$ is opposite to a pair of adjacent electrode stripes $A_i$ and $B_i$. So long as the stripes of electrodes A and B and of the optical filter F are aligned with each other in their longitudinal directions, their relative lateral arrangement is not critical. The optical filter F may be fixed to the faceplate 4 which closes the front end of the tube envelope 5 so that the latter encloses the photoconductive layer 1, the electrodes A and B, the glass plate 3 and the optical filter F.

The image pickup tube 2 has an electron gun 11 in the tube envelope 5 for directing an electron beam against layer 1, and a deflection coil 6, focusing coil 7 and alignment coil 8 extend about the tube envelope to produce respective magnetic fields for acting on the electron beam. In front of the face plate 4 there is an image lens 9, by means of which the image of an object 0 to be televised is focused onto the photoconductive layer 1 through the faceplate 4.

Associated with the described tube 2 is a transformer 12 which consists of a primary winding 12*a* and a secondary winding 12*b* having a mid tap $t_o$ and end terminals $t_1$ and $t_2$ which are respectively connected to the terminals $T_A$ and $T_B$ of the image pickup tube 2. The primary winding 12*a* is connected to a signal source 13 which produces an alternating signal $S_1$ that is synchronized with the line scanning period of thee image pickup tube 2. This alternating signal $S_1$ has a rectangular waveform, for example, as illustrated in FIG. 3, with a pulse width equal to a horizontal scanning period H of the electron beam, for instance, a pulse width of 63.5 microseconds and a frequency which is 1/2 of the horizontal scanning frequency, that is, 15.75/2 KHz. The mid tap $t_o$ of the secondary winding 12*b* of the transformer 12 is connected to the input of a pre-amplifier 15 through a capacitor 14 and is supplied with a DC bias voltage of 10 to 50V from a power source B+ through a resistor R.

Figure 4B:
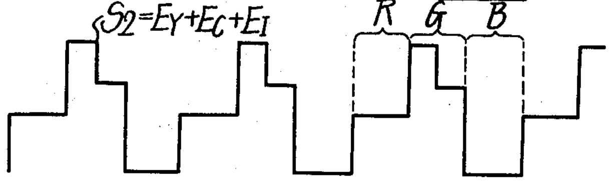

The electrodes A and B are alternately supplied with voltages that are higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, a signal corresponding to the rectangular waveform illustrated in FIG. 4A is derived at the mid tap $t_o$ due to electron beam scanning in a scanning period Hi. When a DC bias voltage, for example, of 30V, is supplied to the mid tap $t_o$ of the secondary winding 12*b* and an alternating voltage of 0.5V is impressed between the terminals $T_A$ and $T_B$, a current flowing across the resistor R varies by 0.05 microamperes and can be used as an index signal. The frequency of this index signal $E_I$ (FIG. 4A) may be determined with reference to the width and interval of the electrodes A and B and one horizontal scanning period of the electron beam, and, for example, may be 4.48 MHz. When the image of the object 10 is focused on the photoconductive layer 1, signals corresponding to the light intensity of the filtered red, green and blue components are produced on the photoconductive layer 1 in overlapping relation with the index signal $E_I$ to produce a composite signal $S_2$, for example, as illustrated in FIG. 4B, in which the reference characters R, G and B respectively designate portions of the composite signal $S_2$ corresponding to the red, green and blue color components. The composite signal $S_2$ is the sum of the luminance signal $E_Y$, the chrominance signal $E_C$ and the index signal $E_I$, that is, $S_2 = E_Y + E_C + E_I$. The frequency spectrum of the composite signal $S_2$, as illustrated in FIG. 5, is determined by the width of the electrodes A and B, the width of the optical filter F and the horizontal scanning period. Therefore, the composite signal $S_2$ is, in its entirety, in a bandwidth of 6MHz and the luminance and chrominance signals $E_Y$ and $E_C$ are respectively arranged in the lower and higher bands. It is preferred to minimize overlapping of the luminance and chrominance signals $E_Y$ and $E_C$ and, if desired, for this purpose a lenticular lens or the like may be disposed in front of the image pickup tube 2 to optically lower resolution and narrow the luminance signal band.

In the next horizontal scanning period $H_{i+1}$ the voltage (alternating signal) applied to the electrodes A and B is reversed in phase, in which case an index signal $-E_I$ is produced, for example, as depicted in FIG. 4A', which is opposite in phase to the index signal $E_I$ shown in FIG. 4A. Accordingly, a composite signal $S_2'$ is derived at the input side of the preamplifier 15, as shown in FIG. 4B', that is, $S_2' = E_Y + E_C - E_I$.

Figure 4C:
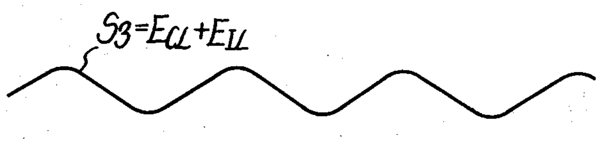
Figure 4A:
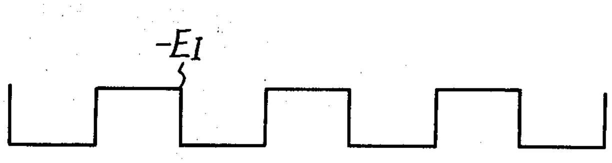
Figure 4B:
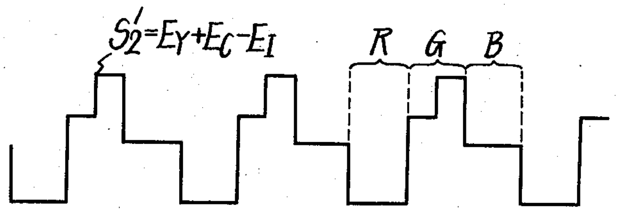
Figure 4C:

Such a composite signal $S_2$ (or $S_2'$) is first supplied to the pre-amplifier 15, to be amplified therein, and is then supplied to the process amplifier 16 for waveform shaping and/or gamma correction. Thereafter, the signal is applied to both a low-pass filter 17 and a bandpass filter 18. As a result, the luminance signal $E_Y$ and a signal $S_3 = E_{CL} + E_{IL}$, for example, as shown in FIG. 4C (or a signal $S_3' = E_{CL} - E_{IL}$ as depicted in FIG. 4C') are separately derived from the lowpass filter 17 and the bandpass filter 18, respectively. In the foregoing equations for $S_3$ and $S'_3$, $E_{CL}$ and $E_{IL}$ are low frequency components or fundamental components of the chrominance signal $E_C$ and the index signal $E_I$ respectively.

Since the repetitive frequencies of the index signal $E_I$ and the chrominance signal $E_C$ are equal to each other, the separation of these signals is achieved in the following manner without using a filter.

Figure 4D:
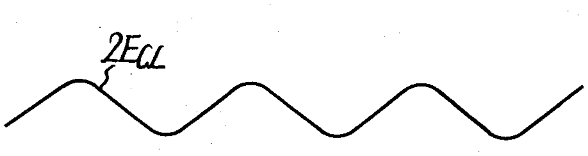

Reference numeral 19 indicates a delay circuit such, for example, as an ultrasonic delay line, by means of which the signal $S_3 = E_{CL} = E_{IL}$ (or $S_3' = E_{CL} - E_{IL}$) derived from the bandpass filter 18 is delayed by one horizontal scanning period 1H. The signal $S_3 = E_{CL} + E_{IL}$ (or $S_3' = E_{CL} - E_{IL}$) in a certain horizontal scanning period $H_i$ and the signal $S_3' = E_{CL} - E_{IL}$ (or $S_3 = E_{CL} + E_{IL}$) in the subsequent horizontal scanning period $H_{i+1}$, which are derived from the delay circuit 19 and the bandpass filter 18 are supplied to an adder circuit 20 to be added together and to provide as an output, a chrominance signal $2E_{CL}$ such as is depicted in FIG. 4D. When the delay circuit 19 is one horizontal scanning period, the content of chrominance signals in adjacent horizontal scanning periods are so similar that they can be regarded as substantially the same. It is also possible to delay the signal from the bandpass filter 18 by three or five horizontal scanning periods due to the similarity of the chrominance signal contents in periods that are spaced even to that extent.

Figure 4E:
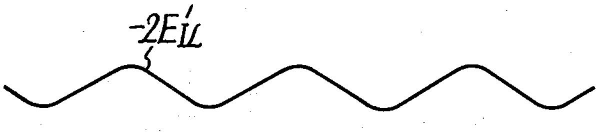
Figure 4F:
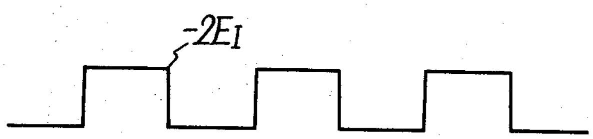

These signals $S_3 = E_{CL} + E_{IL}$ ( or $S_3' = E_{CL} - E_{IL}$) and $S_3' = E_{CL} - E_{IL}$ (or $S_3 = E_{CL} + E_{IL}$) in the horizontal scanning periods $H_i$ and $H_{i+1}$ are applied to a subtraction circuit 21 to achieve a subtraction $(E_{CL} - E_{IL}) - (E_{CL} + E_{IL})$ or $(E_{CL} + E_{IL}) - (E_{CL} - E_{IL})$, and to derive therefrom an index signal $-2E'_{IL}$, as depicted in FIG. 4E, (or $2E'_{IL}$, not shown). The resulting index signal $-2E'_{IL}$ (or $2E_{IL}$) is fed to a limiter circuit 22 to render its amplitude uniform and thereby form an index signal $-2E_I$ (or $2E_I$), as depicted in FIG. 4F.

The index signal $-2E_I$ ( or $2E_I$) thus obtained is reversed in phase at every horizontal scanning period, so that the signal $-2E_I$ is corrected in phase in the following manner. Reference numeral 23 identifies a change-over switch which is preferably an electronic switch in practice. Such switch is shown to have fixed contacts **23*a* and 23*b* and a movable contact 23*c*. The output of the limiter 22 is directly connected to one fixed contact 23*a* of the change-over switch 23 and is connected to the other fixed contact 23*b* through an inverter 24. The change-over switch 23 is arranged so that its movable contact 23*c* makes contact with the fixed contacts 23*a* and 23*b* alternately in successive horizontal scanning periods in synchronism with the alternating signal $S_I$ impressed on the primary winding 12*a* of the transformer 12 to thereby derive the index signal $2E_I$ from the movable contact 23*c*** at all times.

The chrominance signal $2E_{CL}$ derived from the adder circuit 20 is supplied to each of three synchronous detectors 25, 26 and 27. The index signal $2E_{IL}$ is supplied to the synchronous detector 25 through a phase shifter 28 which adjusts the phase of the index signal to the axis of the red signal in order to produce a color difference signal $E_R$–$E_Y$ at the output of the detector 25. In a similar manner the output signal from the phase shifter 28 is supplied to the synchronous detector 26 through a phase shifter 29 to produce a color difference signal $E_G$–$E_Y$ at the output of the detector 26 and the output signal from the phase shifter 29 is supplied to the synchronous detector 27 through the phase shifter 30 to produce a color difference signal $E_B$–$E_Y$ at the output of the detector 27. The phase shifters 29 and 30 each change the phase of the input signals by 120°. These color difference signals $E_R$—$E_Y$, $E_G$—$E_Y$ and $E_B$—$E_Y$ and the luminance signal $E_Y$ are supplied to a matrix circuit 31 which provides color signals $E_R$, $E_G$ and $E_B$ at its terminals $T_R$, $T_G$ and $T_B$, respectively. The color signals thus obtained have to be suitably processed to produce color television signals conforming to the NTSC system and other various systems.

However, if the described camera is modified, particularly with respect to its filter F, the NTSC signals are obtained directly from the output of image pickup tube 2, that is, without demodulating the color signals $E_R$, $E_G$ and $E_B$ obtained at the respective terminals of the matrix 31 on FIG. 1.

As shown on FIG. 6, the filter F of FIG. 2 is preferably replaced by a filter F' in which the blue filter stripe $F_B$ of each triad is replaced by a cyan filter stripe or element $F_{CY}$. Thus, the filter F' is made up of repetitively arranged triads of red, green and cyan filter elements or stripes $F_R$, $F_G$ and $F_{CY}$.

With such a filter F', a video signal as shown in FIG. 7 is obtained from pickup tube 2, and in which red, green and cyan color signals $E_R$, $E_G$ and $E_{CY}$ are spaced apart at angular phase intervals of 120°. If it is assumed that the cyan color signal $E_{CY} = \frac{1}{2}(E_G + E_B)$, the vector addition of the green color signal $\frac{1}{2} E_G$ contained in the cyan color signal $E_{CY}$ to the original green color signal $E_G$ results in the green color signal having an amplitude of 0.87 $E_G$ and its phase is spaced 150° from the red color signal, as shown in FIG. 8. Further, as shown the blue color signal contained in the cyan color signal $E_{CY}$ has an amplitude of $\frac{1}{2}$ $E_B$ and is spaced 120° from the red signal. As a result, the following chrominance signal is produced.

$$E_C = E_R \sin \omega t + 0.87 E_G \sin(\omega t - 150°) + 0.5 E_B \sin(\omega t - 240°) \quad (1)$$

In the luminance signal $E_Y$, the cyan color component $E_{CY} = \frac{1}{2}(E_G + E_B)$ is obtained from light passing through the cyan color filter elements $F_{CY}$, so that the following luminance signal is obtained (the luminance signal is not a vector in this case).

$$E_Y = \frac{1}{3}[E_R + E_G + \frac{1}{2}(E_G + E_B)] = 0.33 E_R + 0.5 E_G + 0.17 E_B \quad (2)$$

It will be seen that the ratio of its respective color components in the above luminance signal is close to that of the luminance signal $Y_{NTSC} = 0.30 E_R + 0.59 E_G + 0.11 E_B$ in the NTSC system which is determined by the visibility characteristic.

Accordingly, the composite color video signal obtained with the filter F' of FIG. 6 can be converted into an NTSC signal by slight correction.

Figure 9:
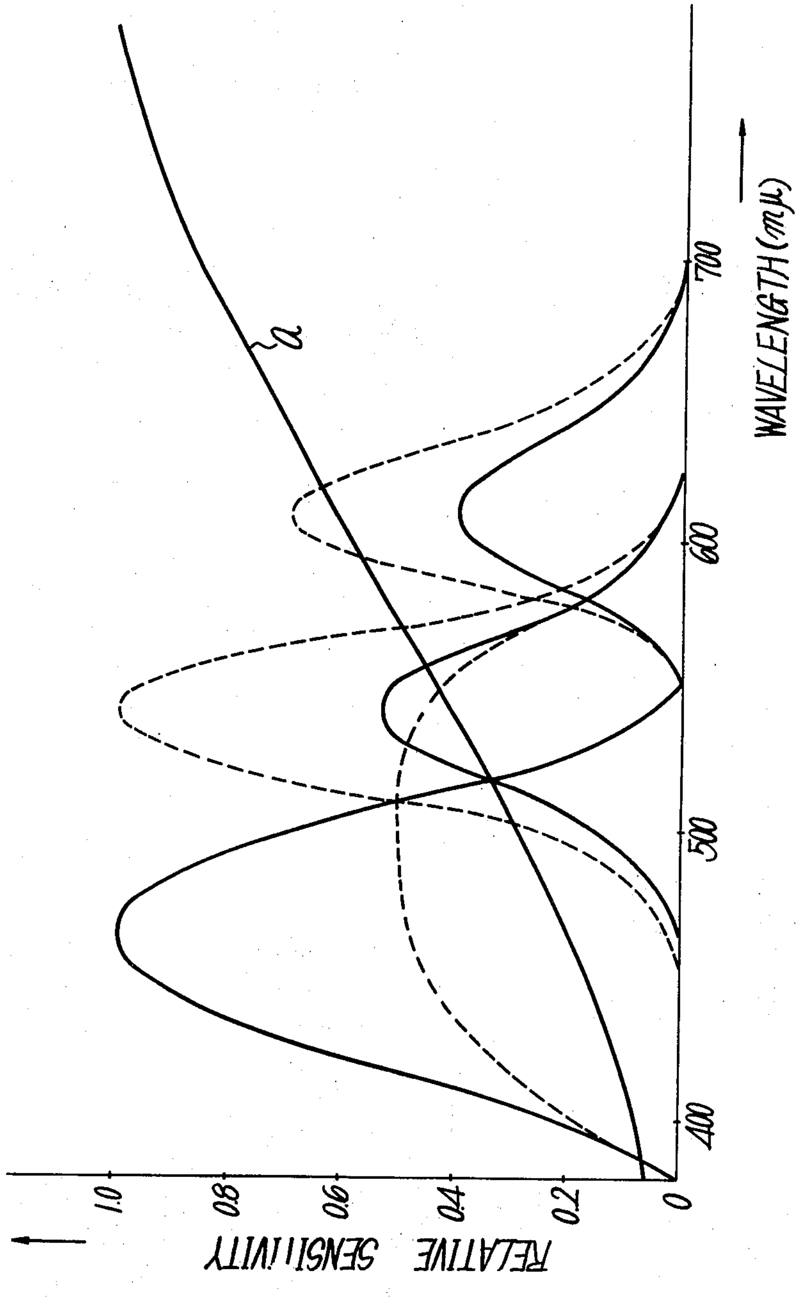
FIG. 9 is a graphic representation of the spectral characteristics of the filters shown on FIGS. 2 and 6, respectively.

In a television studio or the like, illuminated having a color temperature of 3,000°K is often employed. In order to maintain white balance under such illumination, the filter is required to have a spectral characteristic similar to that shown in broken lines in FIG. 9. In FIG. 9, the curves in full lines represent the spectral characteristics when employing the color filter of FIG. 2 consisting of red, green and blue color filter elements and the curves in broken lines represent the spectral characteristics when using the filter F' (FIG. 6) consisting of red, green and cyan color filter elements. Further, the curve *a* represents the energy spectrum for illumination having a color temperature of 3,000°K. It will be apparent from FIG. 9, that the area under the curves representing the filter employing the red, green and cyan color filter elements is twice as large as that with the filter consisting of the red, green and blue color filter elements, from which it follows that the brightness obtainable with the former is substantially twice that with the latter. Therefore, the filter F' consisting of the red, green and cyan color filter elements is also advantageous in obtaining increased brightness.

In the foregoing, consideration has not been given to any decrease in the signal due to slits or spaces provided between the electrode stripes of electrodes A and B for insulating the electrodes A and B from each other. However, such slits may be made as narrow as, for example, about 1 to 5 microns in which case substantially no decrease is caused in the signal.

As will be explained hereinafter, a phase-modulated signal, as represented by FIG. 8, may be amplitude-modulated with a signal having a frequency twice as high as the carrier frequency of the phase-modulated signal, and the phase or amplitude of the phase-modulated signal may be adjusted to that of a required color signal.

Figures 10A, 10B:
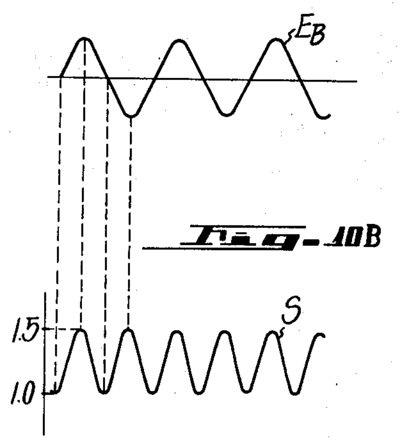
FIGS. 10A–10C and 11A–11C are waveform diagrams to which reference will be made in explaining this invention.
Figure 10C:
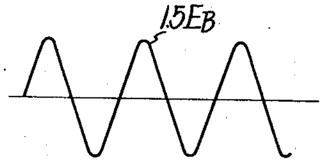

When a blue color signal (a carrier color signal) $E_B$ is amplitude-modulated with a modulating signal S having a frequency twice as high as the carrier frequency of the blue color signal $E_B$ and which is displaced a predetermined angle in phase from the signal $E_B$, in such a manner that the gain of the signal $E_B$ may be 1.5 times its original gain at the positive peak of the signal S and equal to the original gain at the negative peak thereof, as shown in FIGS. 10A and 10B, the resulting blue color signal $E_B$ has a level 1.5 times that of the original signal (FIG. 10C).

Figures 11A, 11B:
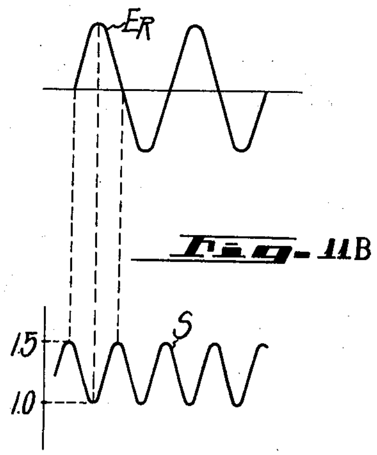
Figure 11C:
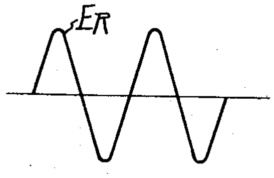

When, in the case of the red color signal (a carrier color signal) $E_R$, the modulating signal S has a negative peak value (the amplification degree being 1) at each of the positive and negative peak values of the red color signal $E_R$ and the amplitude of the signal S remains unchanged (FIGS. 11A and 11B), then the resulting red color signal is unchanged (FIG. 11C).

Figure 12:
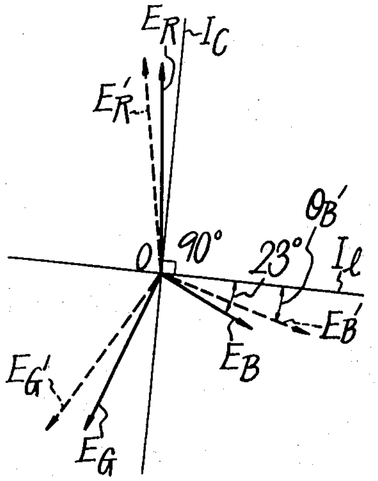
FIGS. 12, 13 and 14 are vector diagrams to which reference will be made in explaining this invention.

Accordingly, when modulating the carrier color signal having the vector arrangement shown on FIG. 8 with the modulating signals S, if the reference phase Il of the modulating signal S, at which the amplitude of the carrier color signal is modulated 1.5 times, is selected to be, for example, 23 degrees ahead of the phase of the blue color signal $E_B$, a phase $I_c$ advanced 90° relative to the phase Il is opposite to that of the carrier color signal and the carrier color signal is modulated one time by the modulating signal S, because the frequency of the modulating signal is twice that of the carrier color signal (FIG. 12).

As a result of the foregoing, the blue color signal $E_B$, which is at the smallest angle with respect to the modulation axis Il, changes to $E'_B$ and is amplified to the greatest extent, the green color signal $E_G$ is amplified less than the blue color signal $E_B$ and the red color signal $E_R$ is hardly amplified at all but its phase is advanced slightly.

The level and phase of the modulated signal are calculated in the following manner. For example, in the case of the blue color signal $E_B$ which makes an angle of 23 ° with the axis Il, the Il axis component of the blue color signal $E_B$ is $E_B$ cos (23°) and the $I_c$ axis component thereof is $E_B$ sin (23°). However, when the blue color signal is modulated, it is amplified 1.5 times on the axis Il but remains unchanged on the axis $I_c$ and the Il axis and $I_c$ axis components of the modulated blue color signal $E'_B$ are 1.5 $E_B$ cos (23°) and $E_B$ sin (23°), respectively. Consequently, the level $E'_B$ of the modulated blue color signal and its angle $\theta'_B$ to the axis $I_c$ are as follows: $E'_B = [(1.5E_B\cos(23°))^2 + (E_B\sin(23°))^2]^1 = 0.717$ $$\theta'B = \arc\tan E_B\sin(23°)/1.5E_B\cos(23°) = 16°$$

Figure 13:
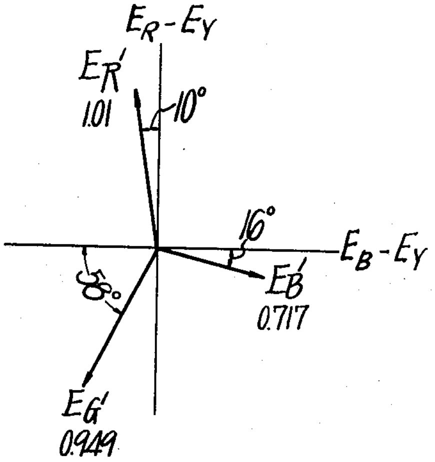

Therefore, the color signal $E_C$ given by equation 1) above becomes a signal Ech' whose vector components are depicted in FIG. 13.

Figure 14:
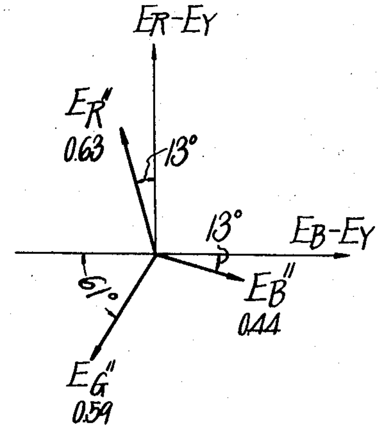

$Ech' = 1.01\ E'_R\sin(\omega t + 10°) + 0.949\ E'_G\sin(\omega t + 148°) + 0.717\ E'_B \sin(\omega t + 254°)$ The color signal Ech' thus obtained is multiplied 1/1.61 times by, for example, an amplifier and its phase is advanced through 3°, to provide an NTSC signal *Ech''*, whose vector components are shown in FIG. 14, and which is geven by the following equation. $Ech— = 0.63\ E—_R \sin(\omega t + 13°) + 0.59\ E''_G \sin(\omega t + 151°) + 0.44\ E''_B \sin(\omega t + 257°)$ 3

Figure 15:
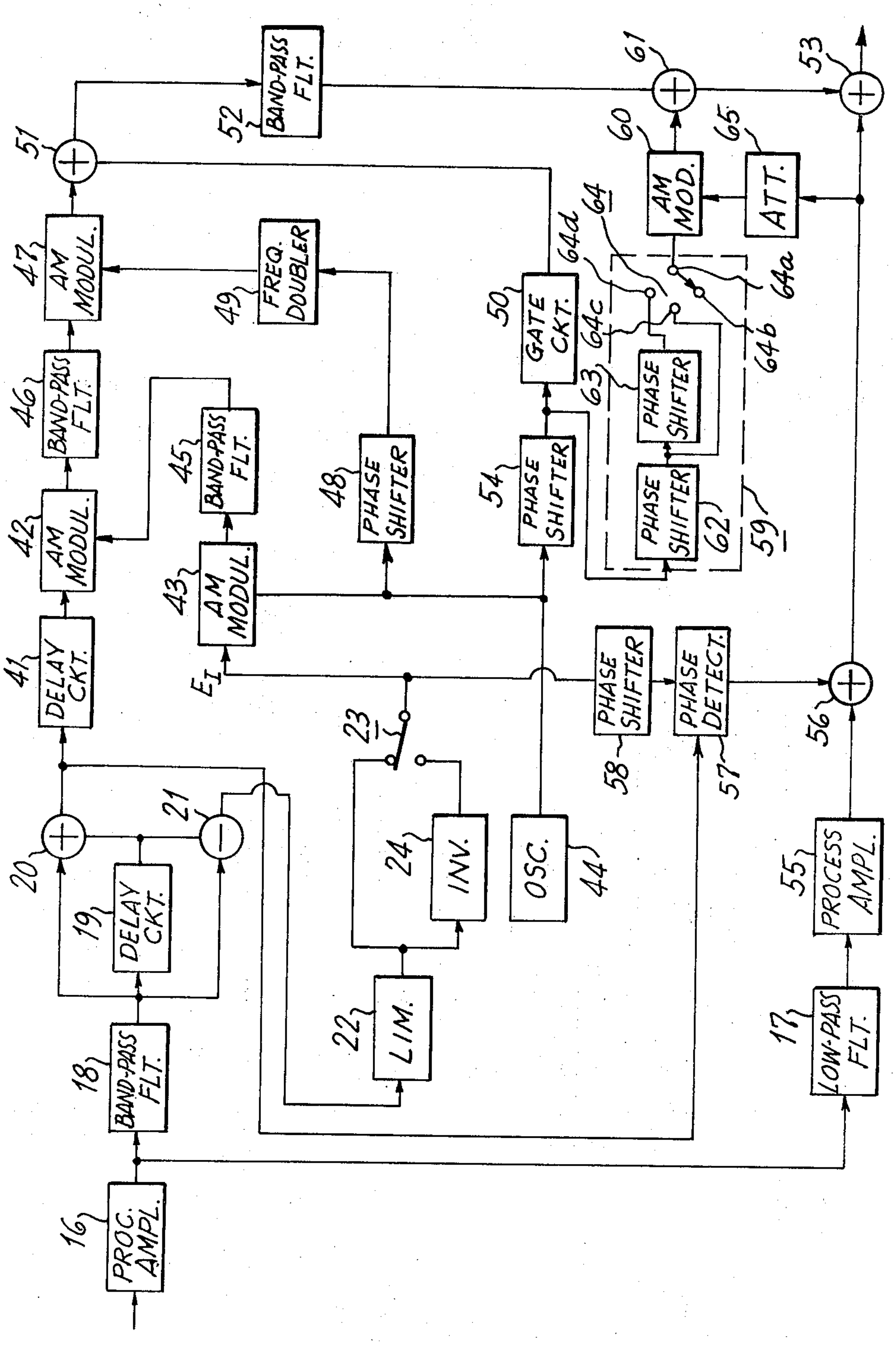
FIG. 15 is a block diagram showing a circuit arrangement according to this invention by which the color camera output signals may be directly converted into NTSC signals with a good white balance.

FIG. 15 illustrates, in block form, one example of a circuit arrangement according to this invention in which the signals derived from the above described color camera are directly converted into NTSC signals. In FIG. 15, components similar to those in FIG. 1 are identified by the same reference numerals and a detailed description thereof will not be repeated. The chrominance signal $E_{CL}$ derived from adder circuit 20 is applied to an AM modulator 42 through a delay circuit 41 by means of which the chrominance signal is delayed so as to be in phase with the index signal.

The index signal $E_I$ derived from change-over switch 23 is supplied to an AM modulator 43 in which it is modulated by a carrier signal $f_o$ ( of 3.58MHz) fed to the modulator 43 from a carrier oscillator 44, such as, for example, a crystal oscillator which generates a stable signal, thereby to provide a signal of 7.98 MHz as the output from modulator 43, which signal is the sum of the index signal $E_I$ of 4.4 MHz and the carrier signal $f_o$. The output from the modulator 43 is supplied to the modulator 42, through a bandpass filter 45 if necessary, to modulate the chrominance signal. The output from the modulator 42 is applied to a bandpass filter 46 which permits the passage therethrough of 3.58 MHz ± 750KHz to obtain a chrominance signal having the carrier of 3.58MHz. Accordingly, the carrier frequency of the chrominance signal $E_C$ from the adder circuit 20 is converted from 4.4 MHz to 3.58 MHz and, at the same time, stabilized by the oscillator 44. The chrominance signal thus obtained is applied to an AM modulator 47 by which vector conversion or correction is effected.

The AM modulator 47 is supplied with a carrier signal which is twice as high as the carrier frequency of the chrominance signal and which is produced by applying the signal from the oscillator 44 through a phase shifter 48 to a frequency doubler circuit 49, and the modulator 47 corrects the vector of the chrominance signal as above described. The corrected chrominance signal from the modulator 47 is fed to an adder circuit 51 in which it is added to a burst signal derived from a gate circuit 50 provided with a phase shifter circuit 54 for the burst signal. The output from the adder circuit 51 is then applied to a bandpass filter 52 to supply only the chrominance signal component of such output to an adder circuit 53.

The luminance signal derived from the low-pass filter 17 is applied to a process amplifier 55 for gamma correction, aperture correction or the like, and thence to an adder circuit 56, in which it is added to a correcting signal from a phase detector 57 to convert its ratio into that of the NTSC signal. That is, the ratios of the luminance signal $E_Y$ contained in the output from the camera according to the present invention is $E_Y = 0.33E_R + 0.5E_G + 0.17E_B$, as given by equation (2), whereas the ratio of the luminance signal $Y_{NTSC}$ of the NTSC signal is $Y_{NTSC} = 0.30E_R + 0.59E_G + 0.11E_B$, as is well-known. Accordingly, a correcting signal $Y_W$ necessary for correction of the luminance signal $E_Y$ is as follows:

$$Y_W = Y_{NTSC} - E_Y = -0.03E_R + 0.09E_G - 0.06E_B \approx -\lambda$$

Figure 16:
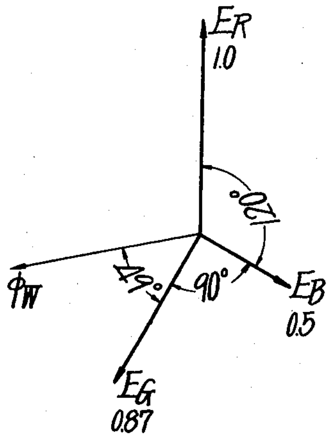
FIG. 16 is a vector diagram for explaining the operation of the circuit arrangement of FIG. 15.

$E_R + 3E_G - 2E_B$. The correcting signal $Y_W$ can be obtained by phase detection of the chrominance signal in the camera output with an axis $\phi_W$ displaced 49° apart from the green color signal $E_G$, as shown in FIG. 16, because the resulting detected output becomes such that $D(W-Y)=\cos(101°)E_R+0.87\cos(45°)E_G+0.5\cos(139°)E_B\approx K(-E_R+3E_G-2E_B)$.

This phase detection is achieved in the phase detector circuit 57, which is supplied with the chrominance signal in the camera output signal from the adder circuit 20 and also supplied with an index signal $S_I$ from the changeover switch 23 through a phase shifter 58. The phase detected output is fed to the adder circuit 56 to add the correcting signal $Y_W$ to the camera output $E_Y$ fed from the process amplifier 55 to provide a luminance signal approximating the NTSC signal. Finally, the luminance signal from adder circuit 56 is added, in the adder circuit 53 to the chrominance signal fed from the bandpass filter 52 through an adder circuit 61 to provide an NTSC signal. The signal added to the chrominance signal in the adder 61 will be explained at a later point in this specification.

In the foregoing example, the index signal has been described as having a frequency of 4.4MHz, as is the case with the carrier of the chrominance signal of the NTSC system. However, the index signal derived from the camera is usually unstable in frequency because the rate of horizontal electron beam scanning of the photoconductive layer of the image pickup tube is not uniform. Thus, even if the index signal is selected to be of 3.58MHz, as above mentioned, it cannot be used as a subcarrier of the NTSC signal. Therefore, as above described, if the index signal of 3.58 MHz is selected, it is amplitude modulated with the stable output of the subscriber oscillator 44 to provide a signal of 7.16 MHz, with which the chrominance signal from the camera is amplitude modulated to correct the carrier frequency of the chrominance signal with the index signal and thereby provide a chrominance signal having a stable subcarrier of 3.58MHz.

Figure 17:
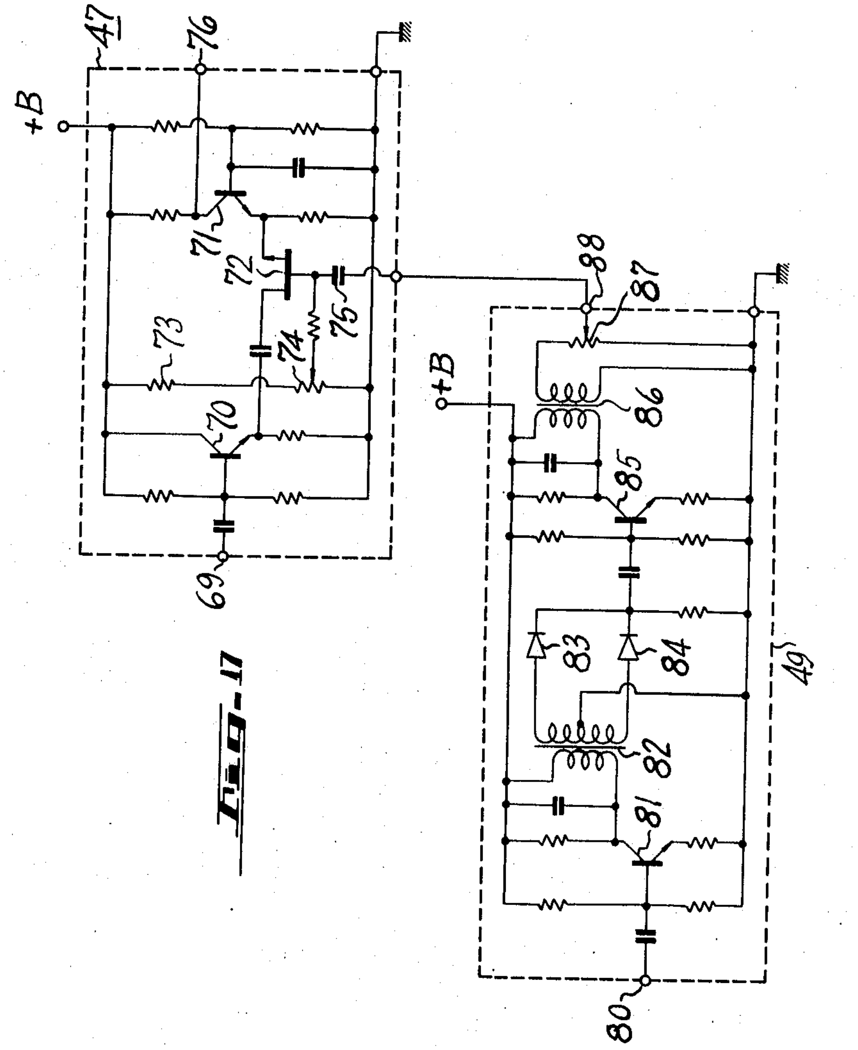
FIG. 17 is a schematic diagram of an AM modulator and frequency doubler included in the circuit arrangement of FIG. 15.

Referring now to FIG. 17, it will be seen that the frequency doubler 49 may have the carrier signal from phase shifter 48 fed to an input terminal 80 to be amplified by a transistor 81 and then supplied to a primary circuit of a transformer 82 to be rendered into a ripple current having a frequency component twice that of the carrier signal by diodes 83 and 84 connected to a secondary winding of the transformer 82. This ripple current is amplified by a transistor 85 and only a signal of a frequency twice that of the carrier signal is picked up with a transformer 86 connected to the collector circuit of transistor 85 and constituting a tank circuit tuned to the frequency twice that of the carrier signal. The signal thus obtained is applied to an output terminal 88 through a potentiometer 87.

Further, as shown in FIG. 17, the AM modulator 47 is made up of an amplifier circuit consisting of a transistor 70 for amplifying a chrominance signal input applied to an input terminal 69 from bandpass filter 46. A transistor 71 has its base grounded and a variable impedance circuit formed by a field effect transistor 72 connected between the output of the transistor 70 and the input of transistor 71. A resistor 73 and a potentiometer 74 are connected in series between a power source, and a gate bias voltage is supplied to the field effect transistor 72 from the potentiometer 74. The gate of the field effect transistor 72 is supplied with a signal having a frequency twice the carrier signal through a capacitor 75 from the output terminal 88 of the frequency doubler 49. In response to such signal supplied to the gate of transistor 72, the impedance of the field effect transistor 72 is varied and the chrominance signal is amplitude modulated to derive a vector converted or corrected chrominance signal at an output terminal 76 which is connected to the adder 51.

A potentiometer 87 is provided to adjust the intensity of the signal fed to the gate of the field effect transistor 72 so as to multiply the blue color signal 1.5 times with the axis II and the potentiometer 74 is provided to adjust the bias so as to perform one-time modulation with the axis $I_c$.

According to the above-described arrangement, a good white balanced NTSC signal is obtained provided the characteristics of the color filter employed in the image pickup tube are proper under illumination having a color temperature of 3,000° K. However, the white balance is lost if the illumination is sunshine, and an image reproduced from the NTSC signal will look pale.

In accordance with the invention, as will be explained in greater detail hereinafter, a signal having the same frequency as the chrominance signal obtained from the image pickup tube 2 is shifted in phase by a given value by a phase shifting circuit 59, is amplitude-modulated with a luminance signal of a predetermined level by an amplitude-modulator 60, and is then added to the original chrominance signal by an adder circuit 61, whereby the white balance is controlled. By varying the phase shifting value in accordance with the color temperature of the illumination, an appropriately white balanced chrominance signal is always obtained.

Referring again particularly to FIG. 15, a first signal of 3.58MHz, having a phase coincident with the phase of the burst signal and obtained from the phase shifter 54 is supplied to an adder circuit 61 through a phase shifter circuit generally designated as 59 and an amplitude modulator 60. The phase shifter circuit 59 comprises series connected phase shifters 62 and 63 and a change-over switch 64. The switch 64 consists of a movable contact 64*a* and fixed contacts 64*b*, 64*c* and 64*d*. The movable contact 64*a* is connected to an input terminal of the amplitude modulator 60. The fixed contact 64*c* is connected to an output terminal of the phase shifter 62 and the fixed contact 64*d* is connected to an output terminal of the phase shifter 63. The fixed contact 64*b* is unconnected.

The controlled luminance signal, which is the output from the adder circuit 56, is supplied to the amplitude modulator 60 through an attenuator 65. The phase controlled signal from the phase shifter circuit 59 is amplitude-modulated by the luminance signal, which has a predetermined level, and the amplitude-modulated signal is then added in an adder circuit 61 to the carrier chrominance signal supplied from the bandpass filter 52. The output from the adder circuit 61 is supplied to the adder circuit 53 as previously described above.

When the color filter or optical filter F of the image pickup tube 2 is designed so as to only obtain a good white balanced composite color video signal under illumination having a color temperature of 3,000° K, and it is desired to obtain a good white balanced composite color video signal under outdoor lighting conditions during slightly cloudy weather (when the color temperature of the light is about 7,500° K) or in bright sunshine (when the color temperature of the light is about 14,000° K), the movable contact 64*a* of the change-over switch 64 is connected to the fixed contact 64*c* or 64*d*, respectively. When the illumination is at a normal studio level, i.e., a color temperature of 3,000° K, the movable contact 64*a* is connected to the fixed contact 64*b*. With the movable contact 64*a* connected to the fixed contact 64*b* the amplitude modulated signal is not added to the chrominance signal, because the carrier signal is not supplied to the modulator 60.

It is preferable that the attenuation factor of the attenuator 65 be varied in response to the change-over switch 64. Moreover, the attenuator 65 in other embodiments is arranged between the modulator 60 and the adder circuit 61 to vary the level of the signal added to the chrominance signal.

Figure 18:
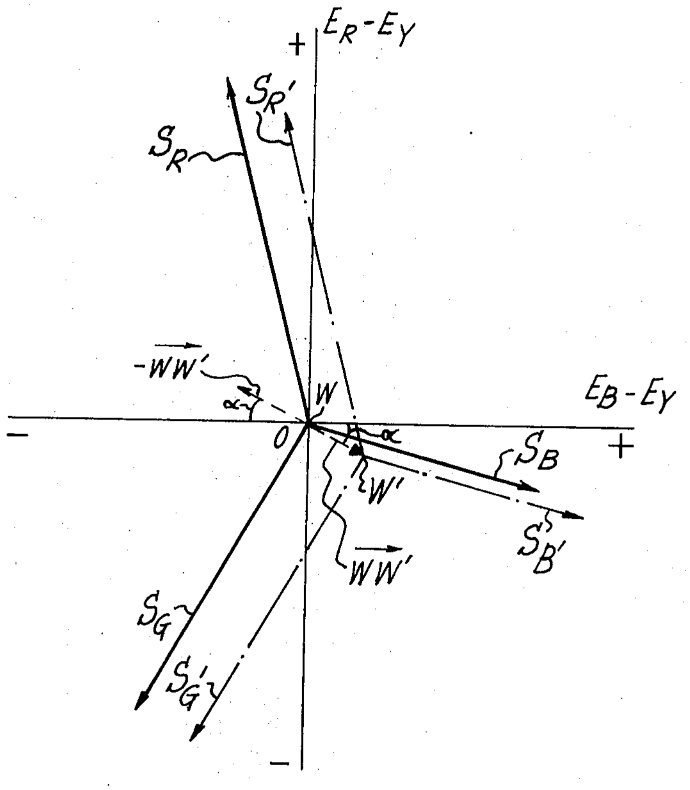
FIG. 18 is a vector diagram to which reference will be made in explaining the operation of this invention.

Referring next to FIG. 18 a description will be given of how much the controlled signal added to the chrominance signal is shifted in phase and of the level of the controlled signal, amplitude-modulated by the luminance signal, which is added to the chrominance signal to correct for the loss of the white balance of a composite color video signal obtained under light having a color temperature of 14,000° K, (corresponding to outdoor light in clear weather) using an image pickup tube having the white balance adjusted under the standard illumination color temperature of 3,000° K.

Vectors of the red color signal $S_R$, the green color signal $S_G$ and the blue color signal $S_B$ are shown on the ($E_B - E_Y$) axis and the ($E_R - E_Y$) axis coordinates in FIG. 18 by full lines. These signals are derived from an object observed by a color television camera having an optical filter for the image pickup tube which is designed to obtain a composite color video signal and maintain a white balance under ideal studio illumination having a color temperature of 3,000° K. The origin, W, of color signal vectors $S_R$, $S_G$ and $S_B$ is coincident with the origin, O, of the coordinates. This means that the white balance is maintained in the composite color video signal from the color television camera.

The equivalent vectors of the red color signal $S_R'$, the green color signal $S_G'$ and the blue color signal $S_B'$ derived from the same object and televised by the same color television camera under an illumination having a color temperature of 14000° K, are shown in FIG. 16 by dot dash lines. The color signal vectors $S_R'$, $S_G'$ and $S_B'$ are obtained by shifting the color signal vectors $S_R$, $S_G$ and $S_B$ in parallel, and their starting point W, to a new location near the $E_B - E_Y$ axis in the fourth quadrant of the coordinates. The new origin of the color signal vectors $S_R'$, $S_G'$ and $S_B'$ is denoted W'. The distance and angle of movement of the origin W may be expressed as a vector $\overrightarrow{WW'}$ having a magnitude of WW' and an angle $\alpha$ with respect to the $E_B - E_Y$ axis. This translocation is representative of the loss of white balance. The reproduced image will be pale.

When the color television camera and supporting circuitry of the present invention is employed under an illumination having a color temperature of 14,000° K, the controlled signal of 3.58 MHz is modulated by the modulator 60 to have an amplitude of WW' and is shifted by $\alpha°$ in phase against the subcarrier signal of 3.58MHz. The phase shifted and amplitude modulated signal is then added to the chrominance signal from the bandpass filter 52. The effect with respect to FIG. 18 is to add a vector $-\overrightarrow{WW}$ to the translocated chrominance signals to restore them to the white balanced condition. It should be realized that in some embodiments the degree of phase shift introduced by the phase shifters 62 and 63 is empirically determined by viewing a white reference plaque with the camera under the desired illumination and then adjusting the particular phase shifter connected with the movable switch contact 64*a* until a proper white balance is obtained. The level of amplitude modulation provided by the amplitude modulator 60 may similarly be adjusted empirically. Once adjusted, however, the camera operator need only rotate the switch contact 64a to the desired position corresponding to the illumination used in order to obtain a properly white balanced image.

Although the amplitude WW' varies not only in accordance with the level of the light from the object to be televised but also little by little in accordance with the change of the intensity of the illumination and the condition of the reflection from the object to be televised, the luminance signal modulating the phase-controlled signal added to the chrominance signal also varies in response to the variation of WW', and so the white balanced chrominance signal is always obtained without being influenced by the level of the light from the object or by the intensity of the illumination and the condition of the reflection from the object to be televised.

The situation in which the loss of white balance of the composite color video signal due to a change in the color temperature of the illumination is corrected has been described above. However, loss of the white balance due solely or in part to the optical filter F may also be corrected by the adjustment of the amount of the phase shift of the phase shifter circuit and by varying the level of the luminance signal supplied to the modulator.

In the description of the above embodiment, the phase shifter circuit 59 has been described as including two phase shifters 62 and 63 and the change-over switch 64, but in other embodiments it may consist of one phase shifter and a circuit for varying the level of the luminance signal suppled to the modulator 42 in accordance with the amount of the phase shift, whereby the white balance is continuously adjusted in response to the color temperature of the illumination. In still other embodiments, the adder circuit 61 is arranged between the delay circuit 41 and the modulator 42, and the carrier signal 4.48 MHz of the chrominance signal $E_C$ is supplied to the phase shifter 62 to control the white balance.

The control of the white balance of a composite signal of a chrominance signal and a luminance signal produced from a single image pickup tube has been described above, however, in other embodiments a luminance signal produced from another image pickup tube may be supplied to an adder circuit 53. In the present embodiment, the white balance in all cases is controlled by using only a white balance control system according to the invention, but in other embodiments it may be controlled by using both a color filter and the white balance control system of the invention together.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A white balance control system for use with a color television camera of the type producing a composite signal of a luminance signal and a chrominance signal comprising means responsive to the composite signal for separating out the chrominance and luminance signals, means for providing a first signal having the same frequency and phase as those of a subcarrier signal of the chrominance signal, means for selectively controlling the phase of the first signal, means for amplitude modulating the phase controlled first signal in response to the luminance signal, and means for combining the amplitude modulated, phase controlled first signal with the chrominance signal to obtain a white balanced chrominance signal.

2. A white balance control system as recited in claim 1, further comprising means for attenuating the luminance signal supplied to the modulating means.

3. A white balance control system as recited in claim 1, wherein the composite signal is representative of an object observed by the camera under an illumination of a particular color temperature, and wherein the means for controlling the phase of the first signal includes means for selectively shifting its phase by a preselected amount to compensate for the observed color temperature of the illumination of the object under observation.

4. An improved white balance control system for use with a color television camera of the type producing a composite signal of a luminance signal and a chrominance signal representative of an illuminated object and including means responsive to the composite signal for separating out the chrominance and luminance signals, means for supplying a subcarrier signal for the chrominance signal, and means for supplying a color burst signal which is combined with the chrominance signal, wherein the improvement comprises means for providing a first signal having a phase which is substantially coincident with the phase of the burst signal and a frequency which is substantially the same as the subcarrier signal of the chrominance signal, means responsive to the first signal for shifting its phase by preselected amounts to compensate for the particular color temperature of the illumination of the object under observation, means for attenuating the luminance signal, means for amplitude modulating the phase shifted first signal in response to the attenuated luminance signal, and means for combining the amplitude modulated, phase controlled first signal with the chrominance signal to correct the white balance thereof.

* * * * *